United States Patent
Lohry et al.

(10) Patent No.: US 6,454,828 B1
(45) Date of Patent: Sep. 24, 2002

(54) METHOD OF PRODUCING ZINC DIAMMINE CHLORIDE AND USES FOR SAME

(75) Inventors: Dirk W. Lohry, Sioux City; Doyle E. Meeker, Onawa, both of IA (US)

(73) Assignee: Nulex, Inc., Sioux City, IA (US)

( * ) Notice: Subject to any disclaimer, the term of this patent is extended or adjusted under 35 U.S.C. 154(b) by 145 days.

(21) Appl. No.: 09/698,788

(22) Filed: Oct. 27, 2000

(51) Int. Cl.$^7$ .......................... C05D 9/00; B01D 21/01; B23K 35/34
(52) U.S. Cl. ................. 71/31; 71/54; 210/724; 423/43; 423/351; 423/409; 504/122; 148/23; 148/26
(58) Field of Search ............... 71/31, 54; 210/724; 423/43, 351, 409; 504/122; 148/23, 26

(56) References Cited

U.S. PATENT DOCUMENTS

| | | | |
|---|---|---|---|
| 2,012,809 A | 8/1935 | Derick | 23/97 |
| 2,104,754 A | 1/1938 | Marsh et al. | 23/55 |
| 2,145,817 A | 1/1939 | Stoops | 23/97 |
| 2,279,200 A | 4/1942 | Keenen | 71/29 |
| 2,288,405 A | 6/1942 | Kepfer | 23/97 |
| 2,647,820 A | 8/1953 | Forward | 23/119 |
| 2,957,762 A | 10/1960 | Young | 71/59 |
| 3,130,034 A | 4/1964 | Young | 71/1 |
| 3,232,738 A | 2/1966 | Bahme | 71/25 |
| 3,441,372 A | 4/1969 | Pegler et al. | 23/55 |
| 3,620,708 A | 11/1971 | Ott | 71/33 |
| 3,753,675 A | 8/1973 | Young | 71/1 |
| 3,849,121 A | 11/1974 | Burrows | 75/103 |
| 3,854,923 A | 12/1974 | Ott | 71/1 |
| 3,958,986 A | 5/1976 | Thorsen | 75/120 |
| 3,967,957 A | 7/1976 | Fonseca | 75/103 |
| 3,981,713 A | 9/1976 | Tucker et al. | 71/28 |
| 4,025,330 A | 5/1977 | Storey | 71/30 |
| 4,033,747 A | 7/1977 | Young | 71/30 |
| 4,042,731 A | 8/1977 | Chay | 427/311 |
| 4,054,516 A | 10/1977 | Izumi et al. | 210/44 |
| 4,071,357 A | 1/1978 | Peters | 75/103 |
| 4,219,348 A | 8/1980 | Parham, Jr. et al. | 71/30 |
| 4,362,608 A | 12/1982 | Ritcey et al. | 204/108 |
| 4,421,616 A | 12/1983 | Bjune et al. | 204/115 |
| 4,500,498 A | 2/1985 | Kruesi et al. | 423/100 |
| 4,631,176 A | 12/1986 | Kruesi | 423/100 |
| 4,865,831 A | 9/1989 | Murphy et al. | 423/463 |
| 5,208,004 A | 5/1993 | Myerson | 423/622 |
| 5,453,111 A | 9/1995 | Myerson et al. | 75/725 |
| 5,464,596 A | 11/1995 | Myerson | 423/101 |
| 5,810,946 A | 9/1998 | Cudahy et al. | 148/26 |
| 5,851,490 A | 12/1998 | Myerson et al. | 423/97 |

FOREIGN PATENT DOCUMENTS

GB 544675 4/1942

OTHER PUBLICATIONS

Dialog 119104229, "Solubility in the zinc chloride–ammonia–water system," by A. G. Burlakova (1995).
Dialog 118195592, "Solubility of zinc chloride in ammoniacal ammonium chloride solutions," by Limpo, et al. (1995).
Dialog 112059160, U.S. Patent #4,865,831 (1995).
Dialog 111013272, "Thermodynamics of the dissociation of diamminedichlorozinc ($ZnCl_2(NH_3)_2$) by modified entrainment," by Gardner, et al. (1995).
Dialog 109011530, "New combined inhibitors," by Gendel, et al. (1995).
Dialog 102151536, "Ammonium chloride–ammonium hydroxide stripping agent for the recovery of anhydrous zinc chloride," by Kruesi, et al. (1995).
Dialog 93135816, "Catalyses of uranium oxidation," by Jackovitz, et al. (1995).
Dialog 90622845, "Recovery of zinc from galvanizer's ash," by Rychaudhuri, et al. (1995).
Dialog 70102606, "Ammines of some transition metal chlorides. Ammonolysis phenomena," by Francois Remy (1995).
Dialog 67094805, "Tetraaminezinc(II) chloride," by Erametsa, et al. (1995).

*Primary Examiner*—Porfirio Nazario-Gonzalez
(74) *Attorney, Agent, or Firm*—McKee, Voorhees & Sease, P.L.C.

(57) ABSTRACT

A method for producing zinc diammine chloride (ZDC) from a solution of zinc ammine sulfate and zinc ammine chloride by precipitating the ZDC by pH neutralization using hydrochloric acid. ZDC can be granulated for dry applications using melt granulation at about 340–360° F. Applications for ZDC include use in fertilizer formulation to provide a combination zinc/nitrogen source free of other metals and use as a galvanizing preflux adjuster. As a galvanizing preflux adjuster, ZDC addition is able to adjust the pH of the preflux while maintaining the desired zinc/ammonia ratio.

18 Claims, No Drawings

METHOD OF PRODUCING ZINC DIAMMINE CHLORIDE AND USES FOR SAME

BACKGROUND OF THE INVENTION

Preparation of Zinc Diammine Chloride

Zinc diammine chloride ($Zn(NH_3)_2Cl_2$, CAS #14826-66-5, a.k.a. zinc ammonia complex, diamino zinc dichloride, zinc diammine dichloride) (ZDC) has been primarily known as an intermediate for production of zinc chloride. It is not commonly known as a commercial product.

Crystallization of zinc diammine chloride from aqueous solutions has been a known technology for many years. Crystallization has been used as a method of separating and concentrating zinc from other cations, especially iron and heavy metals. A number of patents have been issued using this technology to recover zinc values from various by-product materials, such as steel mill dusts and other zinc-containing materials. Many of the patents use a process in which the zinc fume is collected in a scrubbing system containing an ammonium chloride solution. The zinc diammine chloride is crystallized from the ammonium chloride solution by adjusting the pH of the solution to near neutral.

Zinc diammine chloride can be produced in crystalline form. Zinc diammine chloride crystallizes as an unhydrated compound and can be grown into long needle-like crystals. The surface moisture can be easily dried by use of any typical material drying apparatus or process. Patents have been issued concerning the production of anhydrous zinc chloride from zinc diammine chloride crystals. In these patents, the material is heated to decomposition to drive off ammonia.

Uses of Zinc Compounds

Agricultural

Zinc deficiency in soil is a common cause of poor plant growth. Zinc deficiencies can be remedied by applying a zinc salt to the soil directly or in an admixture with other plant nutrients.

Aqueous solutions of zinc ammine chloride and zinc ammine sulfate have been manufactured and marketed for years. These products are typically zinc tetraammine complexes and have been used as a source of zinc. There have been several patents covering the manufacture and use of zinc and other micronutrient ammine complexes as aqueous solutions. The patents cover aqueous zinc ammine complexes with both inorganic and organic anions, the most common being sulfates, chlorides, and nitrates. Some of the other notable use patents cover the manufacture of zinc ammine acetate or other organic anions and its use in anhydrous ammonia. The aqueous zinc ammine complexes are stable enough to prevent precipitation of zinc compounds when added to liquid fertilizers, such as urea/ammonium nitrate and polyphosphate fertilizers. The fertilizer market for such liquid zinc ammine complexes is mature and limited.

Zinc diammine chloride could also be used as a zinc raw material in liquid fertilizers. Zinc diammine chloride does not, however, dissolve as rapidly or mix as easily as the aqueous tetraammine complex. Dry zinc diammine chloride would be more economical to transport since the zinc content is higher. The zinc content of pure zinc diammine chloride is 38.4%.

The majority of zinc applied as fertilizer is used as a blend with other dry fertilizer materials. The most common sources of dry zinc for fertilizer are zinc sulfate (36% Zn) or zinc oxy-sulfate (20% Zn). These products are marketed as granules with the optimal size being matched with the particle size of the fertilizer material to prevent segregation. Some dry zinc fertilizer products, especially the zinc oxy-sulfates, contain high levels of iron and heavy metals. Environmental concerns are driving the market towards purified zinc sources with low heavy metal content. Zinc diammine chloride can solve this need by having very low heavy metal content and provide both zinc and nitrogen as sources of plant nutrients.

In order to produce particles of sufficient size to use the ZDC as a fertilizer, a need exists for a method to produce granules which are consistent in size, hard and nonfriable and which does not drive off an excess amount of ammonia resulting in zinc chloride. What constitutes a "sufficient size" is generally thought to be that which meets uniformity index (UI) and size guide numbers (SGN) for blending with other fertilizer components. For example, The Fertilizer Institute published a Bulk Blend Quality Control Manual in September 1987 which is designed to help producers and blenders in matching (which eliminates segregation) and compatibility of materials. Blended fertilizers are generally mixtures of granules of −6+16 mesh, but the most important consideration is matching the other components in the mixture. See e.g., Cecil Russell, Quality of a Blend Can be Determined, Farm Chemicals, March 1965, p. 86; George Hoffmeister, et al. Bulk Blending of Fertilizer Material: Effect of Size, Shape, and Density on Segregation, Agricultural and Food Chemistry, 1964, p. 64. Alternatively, crystallized zinc diammine chloride can be made into aqueous solution for fertilizer use at distant locations to lower the cost of transportation.

Adjustment of Galvanizing Preflux

There are many processes which produce zinc-containing by-products or waste products which can be utilized as a raw material for production of zinc complexes which have value. One such process is galvanizing. Galvanizing produces "sal ammoniac skimmings, sal skimmings, or wet skims". Many galvanizers use a "top flux" composed of zinc chloride/ammonium chloride double salt in what is called a "wet kettle process". The ratio of zinc chloride to ammonium chloride for a galvanizer's top flux can vary depending on the particular application. The most common ratio is a double salt containing 1 mole of zinc chloride to 3 moles of ammonium chloride. The metal to be galvanized is pickled in either a dilute hydrochloric acid or sulfuric acid solution to clean and prepare the surface, and then it is dipped into a vat of molten zinc through a layer of "top flux". The flux is floated as a melt on top of a vat of molten zinc and the pieces to be galvanized are passed through this layer of flux to aid deposition of zinc. Over time, much of the ammonium chloride portion of the flux is sublimed and the flux becomes contaminated with zinc oxide, charred organics, and various other impurities. When the flux is no longer effective, it is skimmed off and sold as a by-product to various industries as a source of recyclable zinc, i.e., the "sal ammoniac skimmings", "sal skimmings", or "wet skims".

Other galvanizers use a prefluxing process in which the zinc chloride/ammonium chloride double salt is dissolved in water and the pieces to be galvanized are dipped into the flux solution and then into a vat of molten zinc. The zinc chloride/ammonium chloride ratio in these preflux solutions varies depending upon the application. Most operations use ratios of either 1:3 or 1:4 zinc chloride/ammonium chloride. This type of galvanizing is known as "dry kettle". Over time, oxidation of the molten zinc occurs and a layer of zinc, iron, and other metal oxides form on the surface of the molten zinc. This layer is also skimmed off to prevent problems in galvanizing and is commonly known as "dry zinc skims". It is composed of the various metal oxides as well as metallic zinc. This material is more easily recycled than the "wet skims" and commands a higher price.

Dry galvanizing also goes through a pickling process to clean and prepare the metal surface. Unless the metal is well rinsed, carryover from the acid-pickling tank gradually contaminates the preflux solution and lowers the pH to a point where it no longer performs properly. At this point the flux solution must either be changed or adjusted chemically. Properly maintained preflux solution has a pH of 4.0–4.5. One option for adjusting the solution pH is to add some of the "dry skims" from the zinc kettle. The zinc oxide reacts with the excess acid to form zinc chloride. This option changes the optimum zinc chloride/ammonium chloride ratio and requires the addition of ammonium chloride to maintain the balance. Another option is to add ammonia either as anhydrous or aqueous solution. This also changes the optimum zinc chloride/ammonium chloride ratio and zinc chloride needs to be added to maintain the balance.

A better option for adjustment of preflux tanks is needed. Ideally, this would be one which adjusts the pH while maintaining the correct ratio of zinc and ammonia. Zinc skims are primarily ZnO. The addition of ZDC to a preflux solution to adjust the pH is better than current methods because bags of material are easier to store, measure, and use; the ZDC addition is more accurate since ammonia is difficult to meter, and zinc skims have viable analysis and are more difficult to handle; and the addition is much cleaner due to the absence of contaminants found in zinc skims, such as those that come from steel work and the lead content (over 1%).

SUMMARY OF THE INVENTION

An object of the invention is a method for separating zinc diammine chloride from a mixture of zinc ammine chloride and zinc ammine sulfate.

Another object of the invention is a method of granulating zinc diammine chloride.

A further object of the invention is a method for using zinc diammine chloride in or as a dry fertilizer.

Another object of the invention is a method for using zinc diammine chloride for preparing zinc ammine chloride solutions.

Yet another object of the invention is a method of using zinc diammine chloride as a galvanizing preflux adjuster.

These and other objects, features, and advantages will become apparent after review of the following description and claims of the invention which follow.

Zinc diammine chloride (ZDC) can be produced by preferentially precipitating zinc diammine chloride from a mixture of zinc ammine sulfate and zinc ammine chloride. The method for preferentially precipitating ZDC is to lower the pH of the solution to near neutral by addition of an acid, hydrochloric acid. The precipitated ZDC has little, if any, sulfate present.

For some applications of dry ZDC, the "natural" crystalline form of ZDC is inadequate. Granules are often a more desired form. Melt granulation can be an effective method of granulating ZDC. Compaction granulation can also be used effectively for granulating ZDC. Melt granulation is achieved by heating crystalline ZDC to between about 340° F. and about 360° F. to achieve the desired size granules. Compaction granulation of ZDC can be performed using conventional compaction granulation techniques and, optionally, preheating to aid in the granulation. The methods of granulating ZDC are able to achieve granulation without substantial loss of ammonia.

ZDC can be used as a zinc source in a dry fertilizer. The use of ZDC in a dry form has advantages over other zinc compounds which cause handling problems in a dry form and over aqueous solutions. In addition to the handling problems of other zinc compounds, ZDC can provide zinc without contamination by other metals. ZDC crystals or granules are added to dry fertilizer formulations in an amount desired to achieve the appropriate level of zinc. ZDC also provides a nitrogen source. The nitrogen level of the remainder of the formulation takes into account the nitrogen provided by the ZDC.

The present invention also provides a method of using ZDC as a galvanizing preflux adjuster. Addition of ZDC until the desired pH is reached will not only adjust the pH but will assist in maintaining the correct ratio of zinc chloride and ammonia chloride. Another advantage of using ZDC as the preflux adjuster is that ZDC can be produced by use of the galvanizing waste. Ammonium chloride can be premixed with the ZDC in order to further maintain the proper ratio of zinc and ammonia, even if some supplemental adjustment is needed of the ratio.

DETAILED DESCRIPTION OF THE INVENTION

Preparation/Separation and Granulation of ZDC

Though ZDC can be made from any zinc source, spent galvanizing fluxes provide an "ideal" source of raw material to produce ZDC. These spent or contaminated fluxes contain impurities such as iron, sulfates, and lead. The pH of the solution is raised to approximately 10 with anhydrous ammonia to complex the zinc in solution. The impurities, such as iron and lead, are then separated from the solution to yield a purified solution of zinc ammonium chloride with traces of sulfate.

It has been found that adjusting pH to near neutral is an effective method of separating chlorides from sulfates in a mixed ammoniacal solution containing zinc ammine chlorides and zinc ammine sulfates. The optimum pH for separation varies depending on what else is in the solution. At a neutral pH, the zinc diammine sulfate is more soluble than the zinc ammine chloride. Zinc diammine chloride can be produced by preferentially precipitating the zinc diammine chloride from a mixture of zinc ammine sulfate and zinc ammine chloride by lowering the pH to near neutral by addition of an acid, hydrochloric acid. The hydrochloric acid provides part of the chloride ion to the ZDC. Though other pH adjusters can be used, they do not appear to be as efficient. For example, if sulfuric acid is used, the zinc is more soluble as a zinc ammine sulfate and the separation efficiency drops off. By simply neutralizing the solution, the zinc diammine chloride crystals will contain some sulfate (about 10% of the original amount or lower). It is expected that the level of sulfate can be reduced to very low levels by sequentially washing the crystals or going through a recrystallization process. The ZDC can be ammoniated and diluted to form a liquid zinc ammine complex. Then the pH can be adjusted again to a neutral pH using HCl. A large portion of the remaining zinc ammine sulfate will stay in solution. This process may also be effective for separating chlorides from anions other than sulfate, nitrates, for example. Nitrates are more soluble than chlorides at a neutral pH.

Essentially all the sulfate present in a zinc ammine sulfate/chloride mixture remains in the filtrate when zinc diammine chloride is precipitated by lowering the pH to near neutral by the addition of hydrochloric acid. Generally, metal chlorides are more soluble than metal sulfates (zinc chloride solutions contain 30% zinc at ambient temperatures where as zinc sulfate contains 12% at ambient temperatures) (see Perry's Chemical Engineers' Handbook, $7^{th}$ Ed., 1997, Robert H. Perry and Don W. Green, p. 2–124; CRC Handbook of Chemistry and Physics, $75^{th}$ Ed., David R. Lide, Editor, 1994, Sections 4-112–113; CRC Handbook of Chemistry and Physics, $31^{st}$ Ed., Charles D. Hodgman, Editor, 1949, Chemical Rubber Publishing Company, pp. 546–557), therefore, it was unexpected that $Zn(NH_3)_2Cl_2$ would precipitate in preference to $Zn(NH_3)_2SO_4$. Generally, solutions of zinc ammine complexes can be manufactured which contain 20% zinc or more. The highest zinc analysis practical using sulfate as the anion, due to salting out (surpassing the solubility limit), has been around 15% zinc. To produce a 20% zinc solution with a low salt-out temperature, chloride has been used as the primary anion. These solutions would have a salt out temperature of around 10° F. The 10° F. salt out temperature is desirable for storage and handling for example in the northern Corn Belt where much of this type of fertilizer is used.

When zinc diammine chloride is made from an aqueous ammoniacal solution containing 15% zinc by the addition of hydrochloric acid, it is soluble at a temperature of around 200° F. The material should be cooled to below 100° F. to crystallize out most of the ZDC, depending on the concentration used since the temperature is roughly proportional to the concentration.

Alternatively, it is believed the pH can be raised on a zinc chloride solution to produce ZDC as well. Zinc diammine chloride has not been previously produced as a granular material. The present invention provides methods for producing granulated zinc diammine chloride.

Zinc diammine chloride crystallizes as an unhydrated compound and can be grown into long needle-like crystals. The surface moisture can be easily dried by use of any typical material drying apparatus or process. Anhydrous zinc chloride has been produced from zinc diammine chloride by heating to decomposition of the ZDC which drives off the ammonia. The present method is able to granulate the ZDC without significant loss of the ammonia and conversion to zinc chloride.

The present method heats the ZDC at temperatures substantially above those required to evaporate the surface moisture but below the decomposition temperature. This controlled heating will melt the ZDC and allows for granulation without substantial loss of ammonia. The literature value listed for the melting point of ZDC is 210.8° C. (410° F.) (CRC Handbook of Chemistry and Physics, $75^{th}$ Ed., David R. Lide, Editor, 1994, Section 4-113). The decomposition temperature is 271° C. (520° F.) (CRC Handbook of Chemistry and Physics, $75^{th}$ Ed., David R. Lide, Editor, 1994, Section 4-113). Experimental data shows that ZDC can be granulated at temperatures between 340 and 360° F. The temperature range expected to be useful is about 320° F. to about 380° F. This is substantially below the listed melting point for ZDC. It may be that the presence of the relatively small amount of ammonium chloride present forms a eutectic mixture with zinc chloride generated by the loss of ammonia and acts as a binding agent for the remaining ZDC. The material produced has very low hydroscopicity which would indicate that little zinc chloride is present. A granulated ZDC would have many applications, such as fertilizer or use in flux adjustment as described below.

For spherical particles, it is believed that rolling the ZDC while heating adequately granulates the ZDC.

An alternative to melt granulation of the ZDC is compaction granulation. Since the compactor creates heat, some of the ZDC may reach melt temperature and form granules. Compaction granulated ZDC could be ground and sized to match particle sizes of other solids with which it might be mixed. Preheating the material before compaction may aid in the compaction granulation process. Conventional compaction granulation techniques would be used. One of skill in the art would readily be able to determine what process conditions to use in order to achieve granulated ZDC with desired properties. ZDC granulated by this method would have the same sorts of applications as those of melt granulated ZDC. Since ZDC has low water solubility, it is expected to be as difficult to compaction granulate as table salt, therefore, since the ZDC is not sticky, it may require higher pressures to compact.

Use of ZDC

Fertilizer

A more economical way to produce and distribute a zinc source of zinc diammine chloride for use, such as in fertilizers, is in a dry form. The dry form of zinc diammine chloride is able to provide a zinc content of up to 38.4%, higher than other zinc sources and without contamination of iron or heavy metals. In addition to providing a source of zinc, the use of zinc diammine chloride would provide a nitrogen source in the fertilizer formulation. One of skill in the art would readily be able to determine the amount of ZDC to add to a fertilizer formulation in order to provide the desired level of zinc and nitrogen. ZDC has not been commercially available as a dry fertilizer.

Another use for ZDC is preparation of zinc ammine chloride solutions. The high zinc analysis of ZDC would perhaps reduce freight costs to distant locations due to its higher zinc content. The ZDC can be dissolved with water and ammonia to form a highly soluble zinc ammine chloride solution. One of skill in the art would be able to determine mixing order and ratios of the components desired for a particular application of the end solution.

Galvanizing Flux Adjuster

Galvanizing by-products can be used as a starting material for zinc ammine complexes. The zinc diammine chloride can be used back in the galvanizing process as well. Zinc diammine chloride can be used as an effective pH adjusting material for preflux tank adjustment. The zinc diammine chloride would be added to the preflux tank in an amount sufficient to bring the pH to the desired range of 4.0–4.5, when it drops below this during use. Zinc diammine chloride is better than adding "dry skims" or ammonia since either of these adjusters change the zinc chloride/ammonium chloride ratio which requires also adding the other portion of the double salt in order to maintain the balance. The most commonly used molar ratios of zinc chloride/ammonium chloride in preflux solution is either 1:3 or 1:4. Zinc diammine chloride is odorless and much safer to use and store than anhydrous ammonia. The zinc/ammonia ratio of zinc diammine chloride is 1:2. Zinc diammine chloride crystals have experimentally been created which contain about 5% ammonium chloride. Addition of these crystals would tend to gradually change the zinc chloride/ammonium chloride ratio but not as much as the addition of either "dry skims" alone or ammoniation. Zinc ammine chloride can be added by itself to adjust the pH or can be premixed with an amount of ammonium chloride to further maintain the proper ratio.

EXAMPLES

Example 1

Stripping $NH_3$ from Nulex 15

A 500 g sample of Nulex 15 (10.02%w/w $ZnCl_2$, 25.18% $ZnSO_4$, 16.46% $NH_3$, 48.34% $H_2O$), pH 10.80, analyzing

|    |        |
| -- | ------ |
| N  | 14.01% |
| Zn | 15.48% |
| S  | 5.22%  |
| Cl | 4.80%  | was heated with stirring on a hot plate, and a water aspirator was used to pull a vacuum of 26" Hg. The material was stripped until a fair amount of solids began to form. The remaining material weighed 302 g and was analyzed.

TABLE 1

|    | %     | Finish | Start |
| -- | ----- | ------ | ----- |
| N  | 15.76 | 47.6g  | 70.05 |
| Zn | 25.62 | 72.4   | 77.4  |
| S  | 9.13  | 22.6   | 26.0  |
| Cl | 7.91  | 23.9   | 24.0  |

It appears that about 32% of the N was stripped.

Example 2

Nulex Crystals

Sulfuric acid was added to Nulex 15 to reduce the pH to near pH 7. The material was cooled and crystals formed. The crystals were filtered out, and the filtrate and precipitate were weighed.

1000 g Nulex 20 (20.09% Zn)

|        |        |
| ------ | ------ |
| % N    | 16.00  |
| % Zn   | 20.00  |
| % S    | 2.00   |
| % Cl   | 17.28  |
| solids | 62.78  |
| S.G.   | 1.367  |
| lb/gal | 11.40  |
| gal/ton| 175.43 |

(33.20%w/w $ZnCl_2$, 10.07% $ZnSO_4$, 19.51% $NH_3$, 37.22% $H_2O$), pH 10.80, was taken and the pH reduced to pH 7.25 by addition of reagent grade HCl (approximately 253 g). The mixture was cooled to 72° F., and the resultant crystals were filtered off. 254 g of filtered crystals and 968 g of filtrate were recovered.

TABLE 2

|         | Analysis   | Filtrate    | Filter cake (Crystals) |
| ------- | ---------- | ----------- | ---------------------- |
|         | % N        | 13.25       | 15.92                  |
| 200.9 g | % Zn       | 12.11(58%)  | 32.83(41.51%)          |
|         | % S        | 1.48        | 1.39                   |
|         | % Cl       | 11.89       | 34.13                  |
|         | % Moisture |             | 8.55                   |

Example 3

Nulex 20 Cl+HCl

A sample of Nulex 20 Cl (41.38%w/w $ZnCl_2$, 20.21% $NH_3$, 38.41% $H_2O$), pH 10.80 was prepared. It analyzed at 16.57%N and 19.85% Zn. The Nulex 20 Cl was mixed with various amounts of reagent grade HCl (36.3% HCl). After cooling to room temperature (72° F.) slowly, the pH of each solution was measured and volume of precipitate was estimated.

TABLE 3

| Run | g Nulex 20 Cl | g HCl | pH    | Filtrate (g) | Crystals (g) |
| --- | ------------- | ----- | ----- | ------------ | ------------ |
| 1   | 100           | 10    | 8.644 | 98.0         | 10.3         |
| 2   | 100           | 15    | 8.451 | 97.0         | 16.1         |
| 3   | 100           | 20    | 8.292 | 95.6         | 22.5         |
| 4   | 100           | 25    | 8.172 | 95.1         | 27.9         |
| 5   | 100           | 30    | 8.054 | 95.1         | 32.6         |
| 6   | 100           | 35    | 7.948 | 88.8         | 43.2         |
| 7   | 100           | 40    | 7.832 | 90.7         | 46.3         |
| 8   | 100           | 45    | 7.711 | 89.8         | 52.1         |
| 9   | 100           | 50    | 7.521 | 85.7         | 60.4         |
| 10  | 100           | 55    | 7.044 | 79.0         | 72.0         |
| 11  | 100           | 60    | 6.358 | 93.1         | 63.3         |
| 12  | 100           | 65    | 6.298 | 105.4        | 56.3         |
| 13  | 100           | 70    | 5.870 | 118.1        | 49.2         |
| 14  | 100           | 75    | 5.787 | 130.0        | 42.1         |
| 15  | 100           | 80    | 5.724 | 137.9        | 38.9         |

Example 4

Nulex $Zn(NH_3)_2Cl_2$ Precipitation

TABLE 4

| 5300 g | Nulex 20  | Nulex 20 and HCl were added to water heel |
| ------ | --------- | ----------------------------------------- |
| 1668   | $H_2O$    | to maintain a pH of approximately 7.0.    |
| 2750   | 37.3% HCl |                                           |

The mixture was cooled to 65° F. and filtered.

TABLE 5

|             | Filtrate | Filter cake |
| ----------- | -------- | ----------- |
| % N         | 6.3      | 15.95       |
| % Zn        | 1.68     | 34.85       |
| % S         | 1.15     | 0.17        |
| % Cl        | 12.93    | 39.41       |
| pH          | 7.418    |             |
| S.G.        | 1.101    |             |
| % Moisture  |          | 4.50        |
| g recovered | 6782     | 2616        |

Crystals were placed in a dryer drum and heated to 220° F. The dried material was like fine sand (salt). A 50/50 mixture with water was heated to 215° F.

TABLE 6

|           | Wt. %    | g start | g filtrate | g cake  |
| --------- | -------- | ------- | ---------- | ------- |
| N         | 15.96    | 845.88  | 427.27     | 417.25  |
| Zn        | 20.04    | 1062.12 | 113.94     | 911.68  |
| Cl        | 17.31    | 917.43  | 876.91     | 1030.96 |
| S         | 1.64     | 86.92   | 77.99      | 4.45    |
| pH        | 10.366   |         | 7.418      |         |
| S.G.      | 1.361    |         | 1.101      |         |
| HCl 37.3% | 36.28%Cl | 997.61  |            |         |

A portion of the filtered crystals were placed into a lab dryer and again heated to drive off moisture. At a temperature of about 200° F. to 220° F. the material became free flowing with a sand or salt-like consistency. The temperature of the material was increased slowly to about 300° F. Some material began to stick to the drum surface which was being heated externally with Meker burners. As the temperature was further increased to near 350° F., more of the material appeared to melt and began to granulate to a tan-colored somewhat clear product. Material was then removed from the dryer, cooled, and screened. A good portion was in the range of −4 to 10 mesh.

Example 5

Nulex Zn(NH$_3$)$_2$Cl$_2$

TABLE 7

| 5500 g | Nulex 20 | Nulex 20 and water were mixed. HCl was added to reach pH 5.9 at 160° F. The mix was cooled overnight. The pH cold was 7.3. 236 g HCl was added to reach pH 7.0. |
|---|---|---|
| 1666 | H$_2$O | |
| 2956 | 37.3% HCl | |

TABLE 8

|  | Filtrate | Filter cake |
|---|---|---|
| % N | 6.35 | 15.42 |
| % Zn | 1.38 | 33.23 |
| % S | 1.18 | 0.29 |
| % Cl | 12.46 | 38.04 |
| pH | 7.275 | |
| S.G. | 1.097 | |
| % Moisture | | 8.57 |
| g recovered | 6996 | 3010 |

TABLE 9

| component | Start (g) | Filtrate (g) | In Filtrate % recovery | Cake (g) | In cake % recovery |
|---|---|---|---|---|---|
| N | 877.8 | 444.25 | 50.61 | 464.14 | 52.88 |
| Zn | 1102.20 | 96.54 | 8.76 | 1000.22 | 90.75 |
| Cl | 2024.49 | 871.70 | 43.06 | 1145.00 | 56.56 |
| S | 90.2 | 82.55 | 91.52 | 8.73 | 9.68 |

A sample of the material granulated in the previous run at about 350° F. was screened, and the material falling into a −8 mesh class was stored overnight in the open to check for hydroscopicity.

TABLE 10

| Material | Wt. | 24 hrs. | % Gain |
|---|---|---|---|
| −8 mesh | 5.5600 | 0.0206 | 0.37 |
| −4+6 mesh | 5.0774 | 0.0091 | 0.18 |

Material did not appear to be hydroscopic. Apparently only a small amount of ammonia was lost, and little ZnCl$_2$ was formed. It should have good storage characteristics.

Example 6

Nulex 15 SO$_4$ with H$_2$SO$_4$

Mixtures were prepared using Nulex 15 and diluted sulfuric acid in a range of temperatures, cooled, and filtered to separate crystals and filtrate. Diluted reagent grade H$_2$SO$_4$ analyzed 58.17% H$_2$SO$_4$ (19.03% S)

| % N | 14.29 |
|---|---|
| % Zn | 15.15 |
| % S | 5.01 |
| % Cl | 6.86 |
| pH | 10.488 |
| S.G. | 1.335 |

Samples were mixed and allowed to cool to room temperature of 60–65° F.

TABLE 11

| Run | g Nulex 15 | g dil H$_2$SO$_4$ | g filtrate | g filter cake |
|---|---|---|---|---|
| 1 | 100 | 5 | 105 | 0 |
| 2 | 100 | 10 | 110 | 0 |
| 3 | 100 | 15 | 106 | 7.0 |
| 4 | 100 | 20 | 105 | 11.5 |
| 5 | 100 | 25 | 106 | 17.0 |
| 6 | 100 | 30 | 100.7 | 26.7 |
| 7 | 100 | 35 | 95.9 | 37.0 |
| 8 | 100 | 40 | 88.9 | 48.7 |
| 9 | 100 | 45 | 87.1 | 55.8 |
| 10 | 100 | 50 | 85.2 | 62.1 |
| 11 | 100 | 55 | 79.4 | 72.9 |
| 12 | 100 | 60 | 76.5 | 80.6 |
| 13 | 100 | 65 | 73.8 | 88.4 |
| 14 | 100 | 70 | 68.1 | 97.7 |
| 15 | 100 | 75 | 70.6 | 95.3 |
| 16 | 100 | 80 | 67.3 | 106.8 |
| 17 | 100 | 85 | 74.3 | 105 |
| 18 | 100 | 90 | 77.9 | 106 |
| 19 | 100 | 95 | 81.9 | 105 |
| 20 | 100 | 100 | 91.4 | 103 |
| 21 | 100 | 105 | 96.5 | 103 |
| 22 | 100 | 110 | 103.5 | 100 |

Example 7

Granulation of Zinc Diammine Chloride

A sample of Zn(NH$_3$)$_2$Cl$_2$ previously dried at 220° F. was placed into a lab dryer and heated with external Meker burners to about 200° F. The burners were turned down to just maintain heat loss from the room, and a heat gun was used to heat the product. To avoid overheating on the drum surface, the heat from the heat gun was directed at the surface of the product while the drum was rotated at such a speed to provide a good rolling action. As the temperature was raised above 300° F., the surface of the particles began to change and some agglomeration occurred. Temperature was gradually increased to about 360° F. at which time significant granulation occurred with some large (1" diam) rounded balls being formed as well as many round particles of smaller size. There was some ammonia odor from the process but no determination was made to quantify the amount. Material did not appear to be hydroscopic so little ZnCl$_2$ was expected to have formed. It also appeared that the larger crystals of Zn(NH$_3$)$_2$Cl$_2$ formed during the precipitation process tended to retain their shape and form during the heating. Precipitation as smaller crystals may improve product appearance. A number of possibilities appear to be feasible for drying and granulation of the material. For example, granulation by compaction, such as going through briquetting-type equipment, is a possibility. Heating the material to near the melting point prior to compaction may aid in producing a superior product so far as durability of the granule is concerned. Enough additional heat may be generated in the compacting equipment to raise the temperature to the melting temperature, or at least nearly so. It may also be possible to completely melt the material without loss of too much ammonia, i.e., possibly under pressure and use equipment such as a pastillator to form granules. Other types of dryers, heaters, etc., such as a heated auger (e.g., Holoflite™) or heated pug mill type equipment, could possibly be used. It may be possible to melt a portion of the material and use it as a binding agent to obtain granulation. Another possibility is to use a kiln-type dryer and control the process to achieve good granulation. Another concept is to use a kiln type dryer split into zones. With concurrent flow, a hot section nearest the burner or hot air inlet would be maintained at a temperature to provide at least some melting of the material typically believed to be around 340–360° F. at present. Fresh undried zinc diammine chloride crystals containing about 0–10% moisture could be charged into the dryer from the end opposite the burner or hot air inlet to a point about midway of the kiln where it would mix with the melted or partially melted product being recycled. The melted and granulated material would be cooled to below its melting temperature while the incoming material would be heated to the point that any free moisture would be driven off. The discharge temperature would likely be in the range of 200–250° F., but could possibly be either higher or lower. The discharge from the kiln could then be passed over or through a screening system to remove any granules of the desired product size. The oversize material could be ground and recycled along with the undersized material to build granules of the desired size.

It has been noted in previous experiments that when the precipitate formed by addition of $H_2SO_4$ to Nulex 15 that the material does not granulate well. It was discovered that the addition of a portion of the filtrate, which tended to raise the chloride level from about 1.2% to 1.5%, greatly increased the amount of granulation. It may be possible to achieve granulation by using fairly small amounts of $ZnCl_2$ or $ZnSO_4$ along with zinc diammine chloride to granulate at temperatures lower than those noted (i.e., 340–360° F.) either by lowering the melting temperature or providing an acceptable binding agent. Other binding agents, such as lignin sulfonates and other commonly used binding agents used in the fertilizer industry, or possibly HCl or $H_2SO_4$, could also be used.

Example 8

Greenhouse Evaluation Study on Use of ZDC

A greenhouse study was conducted to evaluate ZDC. Evaluation and efficacy of ZDC was based on dry matter production and plant zinc concentration and uptake.

The soil source was a surface soil from a severely eroded Wymore silt loam soil (fine, smectitic, mesic Aquertic Argiudolls). Zinc deficiency symptoms on corn had been observed on the site during the 1999 growing season.

TABLE 12

Soil Characterization.

| Soil characteristic | Value |
|---|---|
| water pH | 6.1 |
| Bray P-1 extractable P | 13 ppm P (low-medium) |
| Ammonium acetate extractable K | 220 ppm K (high) |
| Organic matter | 1.9% |
| DTPA extractable Zn | 0.7 ppm Zn (low) |

The soil was air-dried and sieved through a 1 cm coarse sieve. Five and one-half inch top diameter, plastic-lined pots were used. For each pot, 1600 g of soil was weighed into a plastic bag, and 1 g of monoammonium phosphate (11-52-0) was added to the plastic bags as a nitrogen and phosphorous source to ensure adequate growth. The MPA/soil was thoroughly mixed. About ⅔ of the soil from the thoroughly mixed MAP/soil was added to the plastic-lined pot, with roughly 2 inches of soil remaining to be added to the pot after starter fertilizer application and seed planting. A small furrow was made across the pot and a MAP/zinc starter mix added. An inch of soil was added and 4 seeds of Pioneer brand 34RO7 corn was planted directly over the fertilizer band, and the rest of the soil was added to the pot to cover the seed to one inch deep. Planting was on March 24. The fertilizer rate was calculated as a starter band rate based on the linear feet in an acre planted in 30 inch rows. A 5" length of row was used in the calculations. The treatments used were 6-30-0, no zinc control; 6-30-0, 10# Zn as ZDC; 6-30-0; and 6-30-0, 1# Zn as ZDC. Six replications were used. Pots were watered from the surface using distilled water. All pots received a blanket application of $(NH_4)_2SO_4$ at the rate of 50#N/acre at the initial watering and twice more during the duration of the study.

Pots were thinned to three plants per pot approximately 1 week after emergence. Plants were harvested April 28 for dry matter yield by clipping about one-half inch above the soil surface. Samples were oven-dried at 65° C. for 48 hours and weighed.

The dry plant material was ground through a stainless steel small plant grinder to pass a 2 mm sieve. A quarter gram was weighed, wet-ashed with nitric-perchloric acid, and P and Zn concentration determined using an inductive couple plasma (ICP) instrument. Zinc and P uptake were calculated as dry matter times concentration.

Shortly after emergence, visually the 10# Zn as ZDC appeared slightly shorter than 1# Zn as ZDC. This height difference was apparent throughout the duration of the study. At harvest, visual Zn deficiency symptoms were observed on the check treatments.

An excellent dry matter yield increase to Zn application was found in the zinc treatments compared to the no Zn control, but there was no significant difference in dry matter yield among Zn sources or rates. All Zn treatments substantially reduced P concentration in the plants compared to the no Zn control. The plants from the 10# Zn rate were significantly lower in plant P than the 1# Zn rate.

The Zn concentration in plants from the 10# Zn as ZDC treatment which was roughly double plant Zn concentration for the 1# Zn as ZDC treatment. The 17 ppm Zn concentration in the control is considered a low Zn concentration for 5-leaf stage corn. Zinc uptake data shows a similar treatment effect as did the Zn concentration.

TABLE 13

Results.

| Zn | | Dry | Plant concentration | | Uptake | |
|---|---|---|---|---|---|---|
| Rate[1] lb/ac | Source | Matter[2] g/pot | P % | Zn ppm | P mg/pot | Zn µg/pot |
| 0 | — | 6.77 | .51 | 17 | 34.5 | .11 |
| 1 | ZDC | 7.88 | .36 | 27 | 28.4 | .21 |

TABLE 13-continued

| | | Results | | | |
|---|---|---|---|---|---|
| Zn | | Plant concentration | | Uptake | |
| Rate[1] lb/ac | Source | Dry Matter[2] g/pot | P % | Zn ppm | P mg/pot | Zn µg/pot |
| 10 | ZDC | 7.44 | .33 | 47 | 24.6 | .35 |
| | LSD(.05) | 0.62 | .03 | 12 | — | — |

[1]Zinc rate based on equivalent to band application on 30" row spacing.
[2]Corn harvested at the 5–6 leaf stage.

Having described the invention with reference to particular compositions, theories of effectiveness, and the like, it will be apparent to those of skill in the art that it is not intended that the invention be limited by such illustrative embodiments or mechanisms, and that modifications can be made without departing from the scope or spirit of the invention, as defined by the appended claims. It is intended that all such obvious modifications and variations be included within the scope of the present invention as defined in the appended claims. The claims are meant to cover the claimed components and steps in any sequence which is effective to meet the objectives there intended, unless the context specifically indicates to the contrary.

What is claimed is:

1. A method of producing zinc diammine chloride comprising neutralizing the pH of a mixture of zinc ammine chloride and zinc ammine sulfate.

2. The method of claim 1 wherein the neutralization is via addition of hydrochloric acid.

3. A method of preferentially precipitating zinc diammine chloride from a mixture of zinc ammine sulfate and zinc ammine chloride comprising lowering the pH with HCl to about neutral.

4. A method of preparing a dry fertilizer comprising a zinc source comprising adding zinc diammine chloride (ZDC) to a fertilizer composition.

5. The method of claim 4 wherein the ZDC is crystalline.

6. The method of claim 4 wherein the ZDC is granulated.

7. A fertilizer composition comprising zinc diammine chloride (ZDC).

8. The composition of claim 7 wherein the ZDC is granular.

9. A method of granulating zinc diammine chloride (ZDC) comprising
    heating ZDC to a temperature close to the melting point and below the decomposition point and
    rolling the ZDC until granules are formed.

10. The method of claim 9 wherein the temperature is between about 320° F. and about 380° F.

11. The method of claim 10 wherein the temperature is between about 340° F. and 360° F.

12. The method of claim 9 wherein the rolling and heating are accomplished via a dryer drum.

13. A method of adjusting the pH of galvanizing preflux comprising adding zinc diammine chloride (ZDC) in an amount which adjusts the pH to the desired level.

14. The method of claim 13 wherein the pH is between about 4.0 and about 4.5.

15. The method of claim 13 further comprising premixing the ZDC with ammonium chloride to maintain a desired zinc/ammonia ratio of the preflux.

16. A galvanizing preflux pH adjusting composition comprising zinc diammine chloride (ZDC).

17. The composition of claim 16 further comprising ammonium chloride.

18. A method for producing zinc ammine chloride solution from zinc diammine chloride comprising
    mixing zinc diammine chloride (ZDC) with water and ammonia.

* * * * *